US012725749B2

(12) United States Patent
Mochizuki et al.

(10) Patent No.: US 12,725,749 B2
(45) Date of Patent: Sep. 1, 2026

(54) FUSIBLE LINK UNIT

(71) Applicant: YAZAKI CORPORATION, Tokyo (JP)

(72) Inventors: Tatsuya Mochizuki, Makinohara (JP); Kenichi Tanuma, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 300 days.

(21) Appl. No.: 18/613,071

(22) Filed: Mar. 21, 2024

(65) Prior Publication Data

US 2024/0331963 A1 Oct. 3, 2024

(30) Foreign Application Priority Data

Apr. 3, 2023 (JP) ................................. 2023-059831

(51) Int. Cl.
*H01H 85/02* (2006.01)
*H01M 50/583* (2021.01)

(52) U.S. Cl.
CPC ...... *H01H 85/0241* (2013.01); *H01M 50/583* (2021.01); *H01H 2085/025* (2013.01); *H01M 2220/20* (2013.01)

(58) Field of Classification Search
CPC ............. H01H 85/0241; H01H 85/044; H01H 2085/025; H01H 2085/2075–208; H01M 50/583; H01M 2200/103; H01M 2200/20
See application file for complete search history.

(56) References Cited

U.S. PATENT DOCUMENTS

| | | | | |
|---|---|---|---|---|
| 2010/0019572 A1* | 1/2010 | Kudo | .................. | H01H 85/044 307/10.7 |
| 2016/0196947 A1* | 7/2016 | Matsumoto | ............ | H01H 85/20 337/207 |
| 2016/0203935 A1* | 7/2016 | Onoda | ............. | H01M 10/4257 337/1 |
| 2017/0345601 A1* | 11/2017 | Kitano | ................ | H01M 50/581 |

FOREIGN PATENT DOCUMENTS

| | | |
|---|---|---|
| JP | 5869789 B2 | 2/2016 |
| JP | 2016-131094 A | 7/2016 |

* cited by examiner

*Primary Examiner* — Jacob R Crum
(74) *Attorney, Agent, or Firm* — KENEALY VAIDYA LLP

(57) ABSTRACT

A fusible link unit includes: a lower cover being latched to a battery to be movable in a long side direction and being attached to the battery; a fusible link including a fusible portion that fuses when a current supplied from the battery is an overcurrent, that is latched to the lower cover to be movable in a short side direction intersecting the long side direction, and that is attached to the lower cover; and a battery terminal being attached to the fusible link and connected to a battery post.

3 Claims, 7 Drawing Sheets

1
X
Z
Y
10
13
25
23
3
30
25B
25
25A
A
2
12
4
15
11B 4
42
423
422C
423A
422
422A
422B
421A
421C
423B
412B
412A
421
421B
41
411
431
432
43
321
32
X
Y
Z

FUSIBLE LINK UNIT

CROSS-REFERENCE TO RELATED APPLICATION(S)

The present application claims priority to and incorporates by reference the entire contents of Japanese Patent Application No. 2023-059831 filed in Japan on Apr. 3, 2023.

BACKGROUND OF THE INVENTION

1. Field of the Invention

The present invention relates to a fusible link unit.

2. Description of the Related Art

In the Japanese Patent No. 5869789, a known fusible link unit is configured by, for example, attaching a lower cover to a battery and attaching a fusible link to the lower cover. In the fusible link unit, a battery terminal is connected to the fusible link via a coupling terminal, and the battery terminal is connected to a battery post of the battery.

Such a fusible link unit can be further improved in cumbersome assembly of the fusible link to the battery. For example, in the fusible link unit described above, the fusible link is assembled to the battery by fastening the fusible link and the coupling terminal, connecting the coupling terminal and the battery terminal, and then connecting the battery terminal to the battery post. That is, in the fusible link unit described above, the coupling terminal is used for assembling the fusible link, and it is necessary for the coupling terminal to be fastened. As a result, many work steps are required. Therefore, it is desired to develop a fusible link unit that can be more easily assembled to a battery.

SUMMARY OF THE INVENTION

In view of the above, an object of the present invention is to provide a fusible link unit that can be easily assembled to a battery.

In order to achieve the above mentioned object, a fusible link unit according to one aspect of the present invention includes a holding member being latched to a battery, the holding member being movable in a first direction intersecting an axial direction of a battery post, the holding member being attached to the battery; a fusible link including a fusible portion that fuses when a current supplied from the battery is an overcurrent, the fusible link being latched to the holding member, the fusible link being movable in a second direction that is a direction intersecting the axial direction and the first direction, the fusible link being attached to the holding member; and a battery terminal being attached to the fusible link and connected to the battery post.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the drawings. Note that the present invention is not limited to the embodiment. Constituent elements in the following embodiment include those that can be easily replaced by a person skilled in the art or those that are substantially the same.

Embodiment

The present embodiment relates to a fusible link unit. In the following description, among a first direction, a second direction, and a third direction intersecting one another, the first direction is referred to as a "long side direction X", the second direction is referred to as a "short side direction Y", and the third direction is referred to as a "height direction Z". Here, the long side direction X, the short side direction Y, and the height direction Z are orthogonal to one another. The long side direction X corresponds to a direction along a long side of a battery having a rectangular planar shape. The short side direction Y corresponds to a direction along the short side of the battery. The height direction Z is a height direction of the battery and corresponds to an axial direction of the battery post. Each direction used in the following description represents a direction in a state in which each unit or portion is mounted on a vehicle unless otherwise specified. The term "orthogonal" as used herein includes substantially orthogonal.

Figure 1:
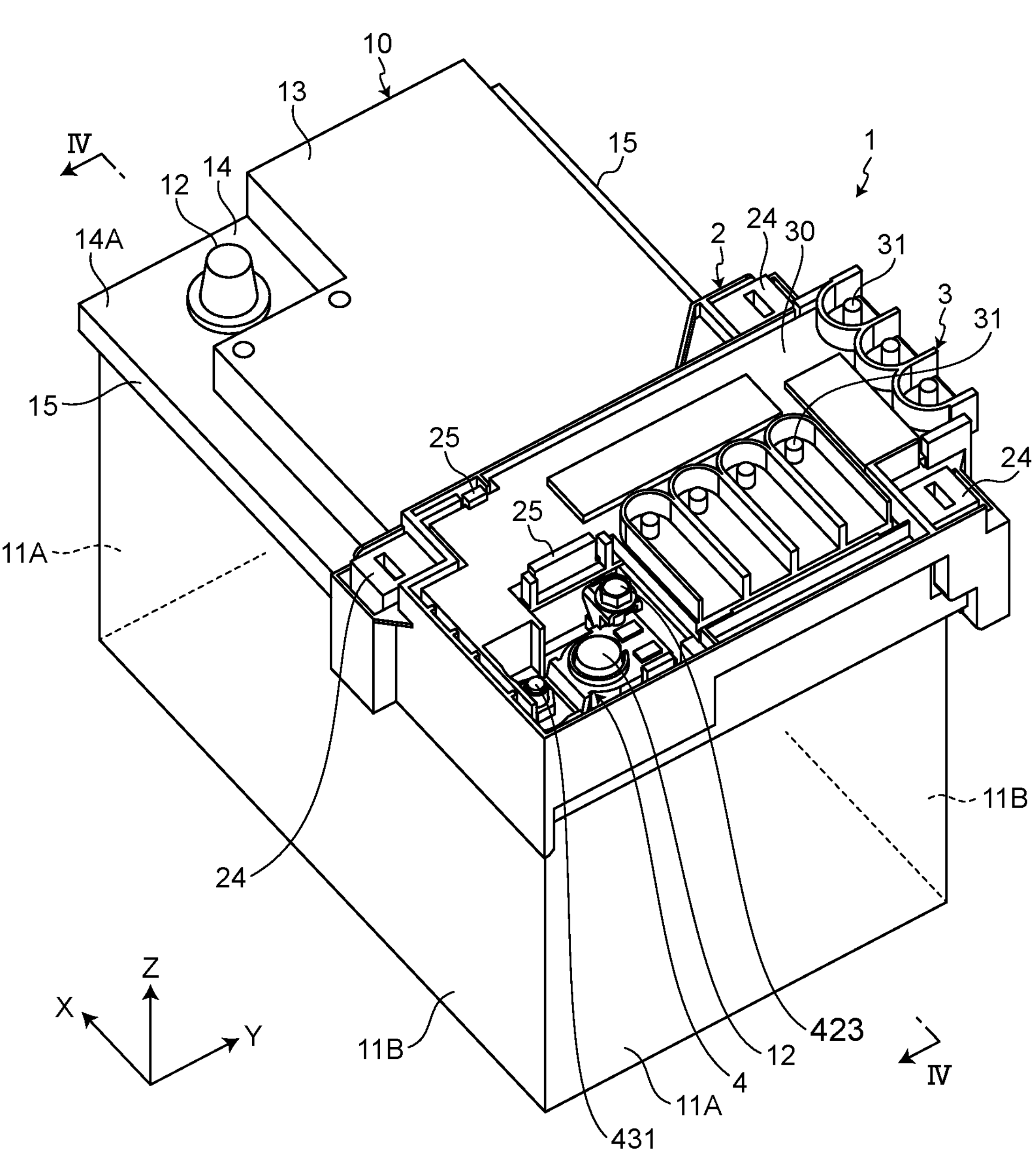
FIG. 1 is a perspective view of a fusible link unit according to an embodiment.
Figure 2:
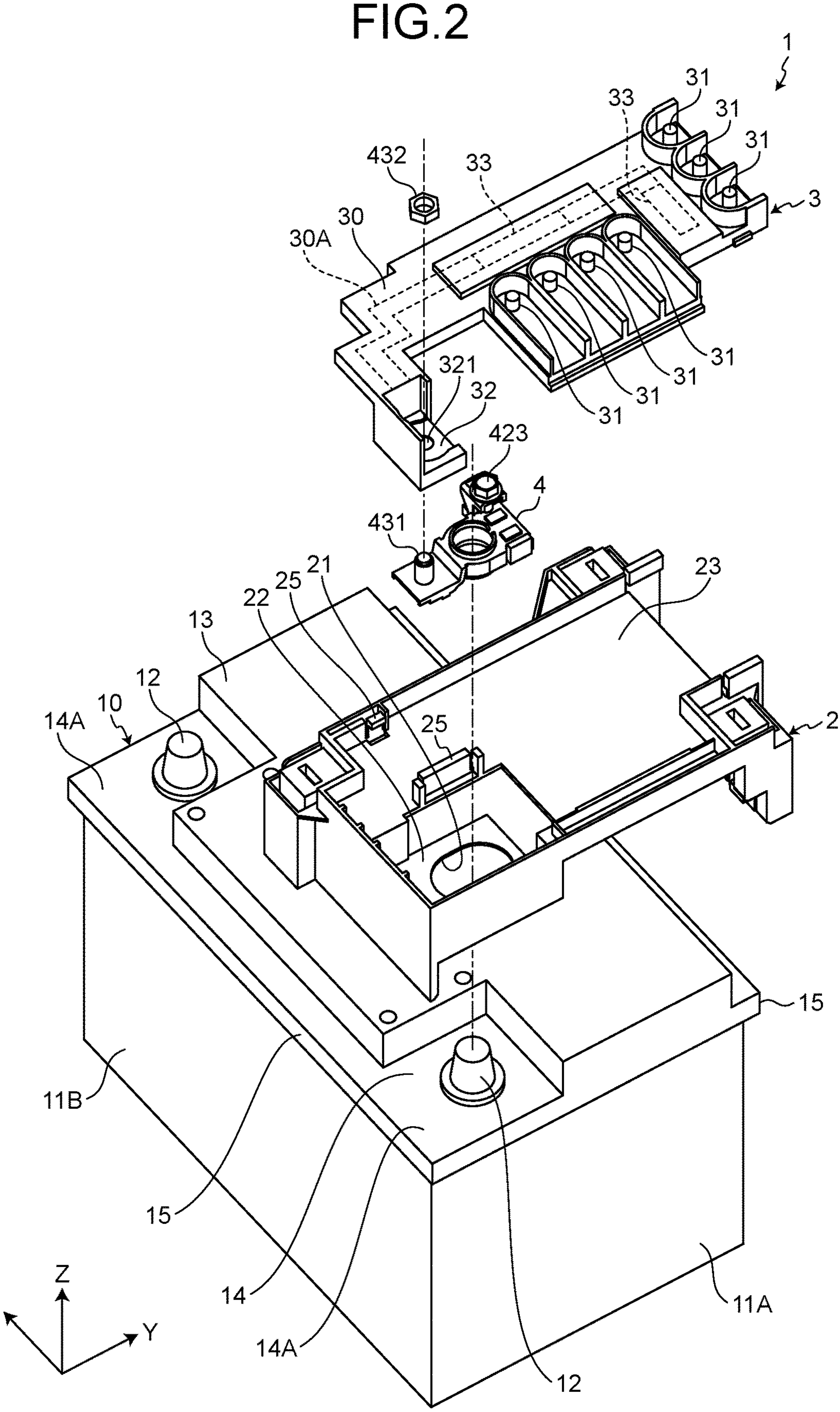
FIG. 2 is an exploded perspective view of the fusible link unit according to the embodiment.

As illustrated in FIGS. 1 and 2, a fusible link unit 1 is a unit that is attached to a battery 10 mounted on a vehicle and performs overcurrent protection on an electric device that receives electric power from the battery 10. The battery 10 is a power storage device that supplies electric power to an electric device installed in a vehicle. The battery 10 has, for example, a rectangular parallelepiped appearance with a rectangular planar shape. For example, the battery 10 has two side surfaces 11A formed along the short side direction Y and two side surfaces 11B formed along the long side direction X. Here, the rectangular parallelepiped includes a substantially rectangular parallelepiped, and the rectangle includes a near rectangle.

The battery 10 is provided with a battery post 12. The battery post 12 is a terminal member for extracting electric power from the battery 10. The battery post 12 is provided in a recess 14 recessed from an upper surface 13 of the battery 10. The recess 14 is, for example, a region formed one stage lower than the upper surface 13. The recess 14 is formed at two places at corner portions of the battery 10 and formed at positions of both ends of one side surface 11B. The battery posts 12 are installed upright at a floor surfaces 14A of the two recesses 14, respectively. The battery post 12 has a columnar or truncated cone shape, and is formed of metal, for example. The battery post 12 is provided, for example, with an axial direction A as a direction along the height direction Z of the battery 10. For example, a European norm (EN) standard battery is used as the battery 10. The fusible link unit 1 is installed for one of the two battery posts 12.

The fusible link unit 1 includes a lower cover 2, a fusible link 3, and a battery terminal 4. The lower cover 2 is a holding member attached to an upper portion of the battery 10 and holds the fusible link 3. The lower cover 2 is, for example, a plate-shaped member having a rectangular planar shape. The lower cover 2 is formed larger than the battery 10 in the short side direction Y and is provided to cover a part of the upper surface 13 and a part of the recess 14 of the battery 10 and include the installation position of one battery post 12. An installation hole 21 is formed in the lower cover 2. The installation hole 21 is a hole through which the battery post 12 is inserted. The installation hole 21 is formed, for example, in a lower layer portion 22. The lower layer portion 22 is a plate-shaped portion formed at a position one stage lower than an installation surface 23 on which the fusible link 3 is installed. The installation hole 21 is formed larger than an insertion hole 411 of the battery terminal 4 to be described later.

Figure 3:
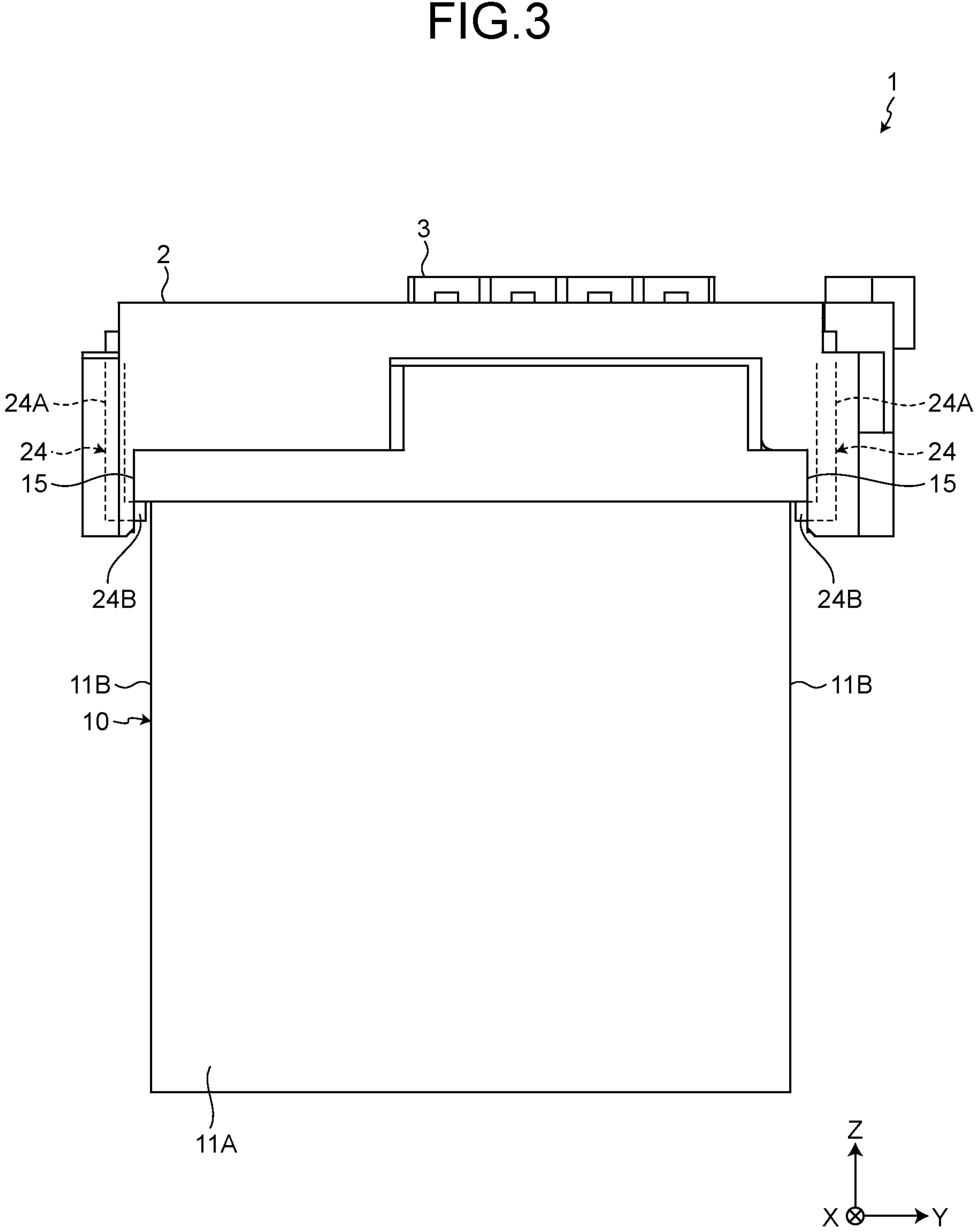
FIG. 3 is a side view of the fusible link unit according to the embodiment.

The lower cover 2 is latched to be movable in the long side direction X with respect to the battery 10. The long side direction X is a direction along the side surface 11B and is a first direction intersecting the axial direction A of the battery post 12. For example, as illustrated in FIG. 3, the lower cover 2 has latches 24 each extending downward from a side portion in the short side direction Y. The latch 24 is a first latch that is latched with a protrusion 15 protruding from the side surface 11B of the battery 10. The latches 24 are respectively provided on both side portions in the short side direction Y of the lower cover 2. The latch 24 includes an arm 24A extending downward and a hook 24B protruding from the arm 24A toward the side surface 11B side and latching the protrusion 15. The latch 24 allows the movement of the lower cover 2 in the long side direction X with respect to the battery 10 by latching the protrusion 15 of the battery 10. That is, the lower cover 2 is latched such that the lower cover 2 is restricted from moving in the short side direction Y and the height direction Z by forming the latch 24 but can move in the long side direction X with respect to the battery 10. The lower cover 2 may be movably latched to the battery 10 by a mechanism other than the protrusion 15 and the latch 24. Note that the fusible link unit 1 may include an upper cover that covers an upper portion of the lower cover 2.

In FIGS. 1 and 2, the fusible link 3 is a member that prevents an overcurrent from flowing through an electric device connected to an external output portion 31. The fusible link 3 includes the external output portion 31, a terminal connection portion 32, and a fusible portion 33. The external output portion 31 is a terminal member connected to an electric device installed in a vehicle, and for example, a stud bolt is used. For example, a plurality of the external output portions 31 are provided in a body 30 of the fusible link 3. The body 30 is a plate-shaped member, and is made of, for example, a resin material. The main body 30 is installed on the installation surface 23 of the lower cover 2. The terminal connection portion 32 is a portion connected to the battery terminal 4 and is disposed at a position lowered downward from the body 30. A connection hole 321 is formed in the terminal connection portion 32. The external output portion 31 and the terminal connection portion 32 are electrically connected via the fusible portion 33. The external output portion 31 and the terminal connection portion 32 are connected by, for example, a conductive member 30A such as a bus bar built in the body 30. The fusible portion 33 is provided to be incorporated in the conductive member 30A. The fusible portion 33 includes a fuse element that fuses when a current supplied from the battery 10 becomes an overcurrent. The fusible portion 33 functions as a fusible link or a fuse. For example, the fusible portion 33 fuses when a current having a predetermined current value or more flows in the fusible link 3 for a predetermined time or more. A plurality of the fusible portions 33 may be provided for the conductive member 30A.

Figure 4:
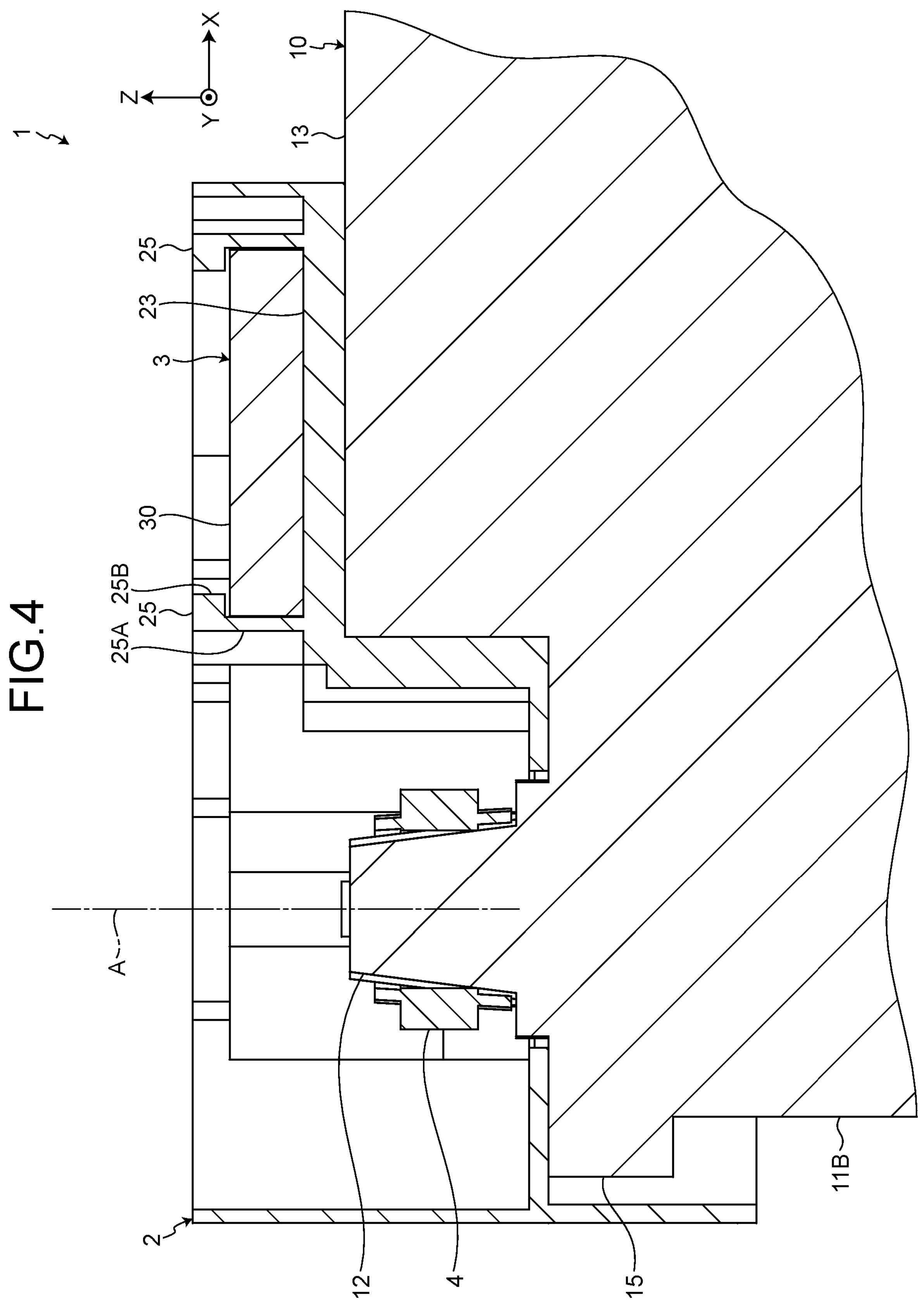
FIG. 4 is a sectional view of the fusible link unit taken along line IV-IV in FIG. 1.

As illustrated in FIG. 4, the fusible link 3 is latched to be movable in the short side direction Y with respect to the lower cover 2. The short side direction Y is a direction along the side surface 11B and is a second direction intersecting the axial direction A of the battery post 12 and the long side direction X. In the fusible link 3, for example, the body 30 is latched to a latch 25 formed in the lower cover 2. The latch 25 is a second latch for latching the body 30 of the fusible link 3. A plurality of the latches 25 are provided on the installation surface 23, for example, and is formed to sandwich the body 30. The latch 25 includes an arm 25A extending upward and a hook 25B protruding from the arm 25A toward the body 30 side. The latch 25 allows the movement of the fusible link 3 in the short side direction Y with respect to the lower cover 2 by latching the body 30. That is, the fusible link 3 is restricted from moving in the long side direction X and the height direction Z by being latched by the latch 25, but this latching allows the fusible link 3 to move in the short side direction Y with respect to the lower cover 2. The fusible link 3 may be movably latched to the lower cover 2 by a mechanism other than the latch 25.

Figure 5:
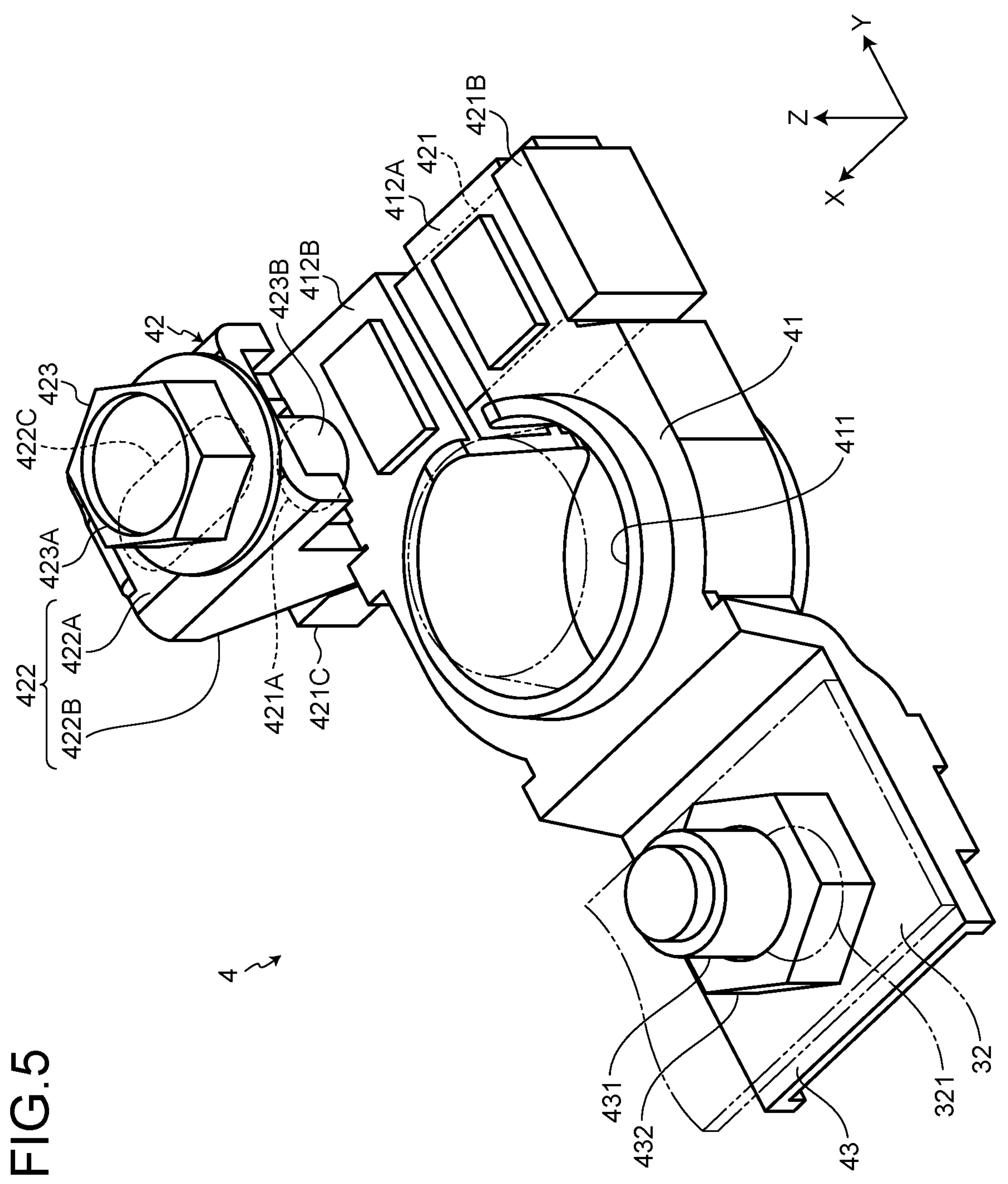
FIG. 5 is a perspective view of a battery terminal of a fusible link according to the embodiment.

As illustrated in FIG. 5, the battery terminal 4 is a terminal member connected to the battery post 12 and is made of, for example, a conductive material such as metal. The battery terminal 4 includes a mounting portion 41, a clamping mechanism 42, and a connection portion 43. The mounting portion 41 is a portion mounted to the outer periphery of the battery post 12. In the mounting portion 41, the insertion hole 411 is formed through which the battery post 12 is inserted. For example, the mounting portion 41 has a shape in which a part of a ring shape is cut away. The connection portion 43 is continuously formed to the mounting portion 41. The connection portion 43 is a portion for connection to the terminal connection portion 32 of the fusible link 3 and is formed in a plate shape. A stud bolt 431 is installed upright at the connection portion 43. The connection portion 43 is connected to the terminal connection portion 32 by inserting the stud bolt 431 through the terminal connection portion 32 and screwing and fastening a nut 432 to the stud bolt 431.

The clamping mechanism 42 is a mechanism that tightens the mounting portion 41 and attaches the battery terminal 4 to the battery post 12. The clamping mechanism 42 includes a nut member 421, a wedge member 422, and a bolt 423. In the nut member 421, an insertion hole 421A screwed with the bolt 423 is formed. The nut member 421 has, for example, a rod shape having a rectangular cross section and is disposed in the long side direction X. The nut member 421 is provided to be inserted through clamping pieces 412A and 412B of the mounting portion 41. The clamping pieces 412A and 412B are formed with a ring-shaped cut-away portion in the mounting portion 41 interposed therebetween. That is, the clamping pieces 412A and 412B are formed to separate from each other in the long side direction X. The clamping pieces 412A and 412B are moved in a direction of approaching each other by the clamping mechanism 42 to apply a clamping force to the mounting portion 41.

The end portions of the nut member 421 form an enlarged portion 421B and an enlarged portion 421C, both of which are enlarged in a direction intersecting the long side direction X. The enlarged portion 421B and the enlarged portion 421C are formed in sizes that do not allow insertion of the clamping pieces 412A and 412B. The enlarged portion 421B is provided to come into contact with the clamping piece 412A, and the enlarged portion 421C is provided to come into contact with the wedge member 422.

The wedge member 422 is provided above the nut member 421 and includes a base 422A and a wedge portion 422B. The base 422A is a plate-shaped member for installing a head 423A of the bolt 423 and is disposed at a position separated from the insertion hole 421A in the height direction Z. A long hole 422C through which a shaft 423B of the bolt 423 is inserted is formed in the base 422A. The long hole 422C is a hole elongated in the long side direction X. Therefore, the bolt 423 can move relative to the wedge member 422 in the long side direction X. The wedge portion 422B is a triangular plate provided to hang down from the end portion of the base 422A and is provided at each position of both ends of the base 422A. The wedge portion 422B is formed to be tapered downward and is provided to come into contact with the enlarged portion 421C and the clamping piece 412B.

By fastening the bolt 423 to the nut member 421, the clamping mechanism 42 pushes down the wedge member 422 together with the head 423A of the bolt 423, and clamps the mounting portion 41 by the movement of the nut member 421 in the long side direction X. That is, when the bolt 423 is fastened to the nut member 421, the wedge portion 422B of the wedge member 422 is pushed down, and the wedge portion 422B enters between the enlarged portion 421C and the clamping piece 412B. Therefore, the enlarged portion 421C and the clamping piece 412B are separated from each other, the nut member 421 moves in the long side direction X (the upper left direction in FIG. 5), and the clamping piece 412B and the clamping piece 412A approach each other. As a result, the mounting portion 41 clamps the battery post 12, and the battery terminal 4 is attached to the battery post 12.

As a mechanism for clamping the battery terminal 4, a mechanism other than the above-described clamping mechanism 42 may be used as long as the battery terminal 4 can be attached to the battery post 12 by bringing the clamping pieces 412A and 412B close to each other.

Next, assembly of the fusible link unit 1 according to the present embodiment will be described.

Here, a case in which the fusible link unit 1 is assembled to the battery 10 installed in the vehicle will be described.

First, as illustrated in FIG. 2, before the fusible link unit 1 is assembled to the battery 10, the battery terminal 4 is connected to the fusible link 3, and the fusible link 3 is attached to the lower cover 2. The battery terminal 4 is connected to the fusible link 3 by inserting the stud bolt 431 of the battery terminal 4 through the hole 321 of the terminal connection portion 32 of the fusible link 3 and fastening the nut 432 to the stud bolt 431 (see FIG. 5). As a result, the battery terminal 4 is attached to and integrated with the fusible link 3. At this time, the fusible link 3 and the battery terminal 4 are directly connected to each other.

In FIG. 2, the fusible link 3 is attached to the lower cover 2 while the body 30 of the fusible link 3 is placed on the installation surface 23 with the battery terminal 4 attached to the fusible link 3. At this time, the latch 25 is latched to the body 30, and the fusible link 3 is attached to the lower cover 2. As a result, the fusible link 3 is attached to and integrated with the lower cover 2, but the fusible link 3 is movable in the short side direction Y with respect to the lower cover 2 (see FIG. 6).

Figure 6:
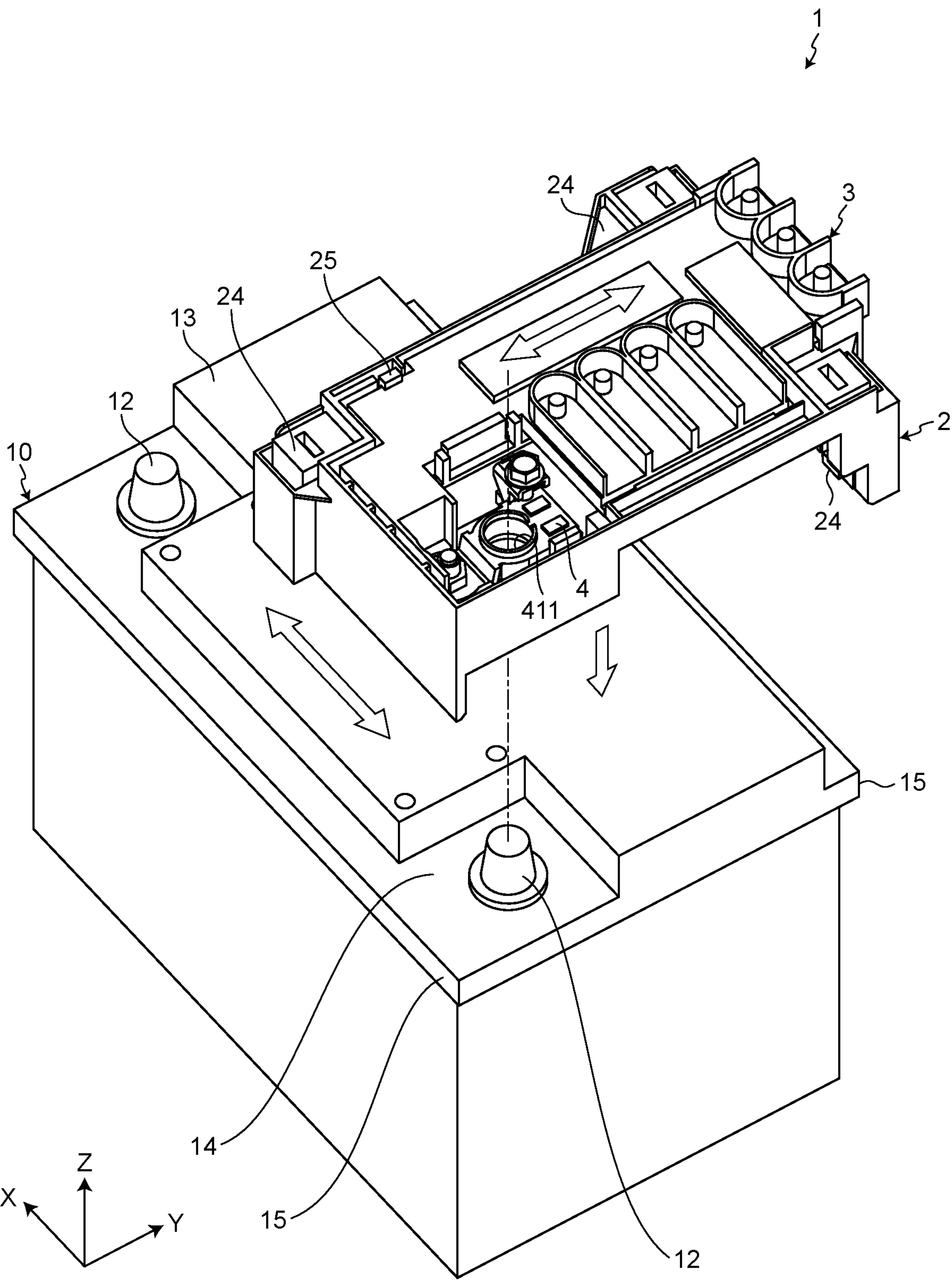
FIG. 6 is an explanatory view of assembly of the fusible link according to the embodiment.

Then, as illustrated in FIG. 6, the fusible link unit 1 is assembled to the battery 10. The fusible link unit 1 is assembled while adjusting the positions of the lower cover 2 and the fusible link 3 so that the battery post 12 is inserted through the insertion hole 411. For example, the position of the insertion hole 411 in the short side direction Y is adjusted by moving the fusible link 3 in the short side direction Y with respect to the lower cover 2. The position of the insertion hole 411 in the long side direction X is adjusted by moving the lower cover 2 in the long side direction X with respect to the battery 10.

Then, the lower cover 2 is placed on the upper surface 13 of the battery 10 in a state in which the position of the insertion hole 411 is adjusted. Then, as illustrated in FIG. 3, the lower cover 2 and the fusible link 3 are attached to the battery 10 by latching the latch 24 of the lower cover 2 to the protrusion 15 of the battery 10. In FIG. 1, the bolt 423 of the battery terminal 4 is fastened, and the battery terminal 4 is attached to the battery post 12. By attaching the battery terminal 4 to the battery post 12, the fusible link 3 is fixed to the battery 10, the lower cover 2 is also fixed to the battery 10, and the assembly of the fusible link unit 1 with respect to the battery 10 is completed. Since the fusible link unit 1 can be assembled by simply fastening the bolt 423 as the fastening work, the assembling work can be easily performed.

Figure 7:
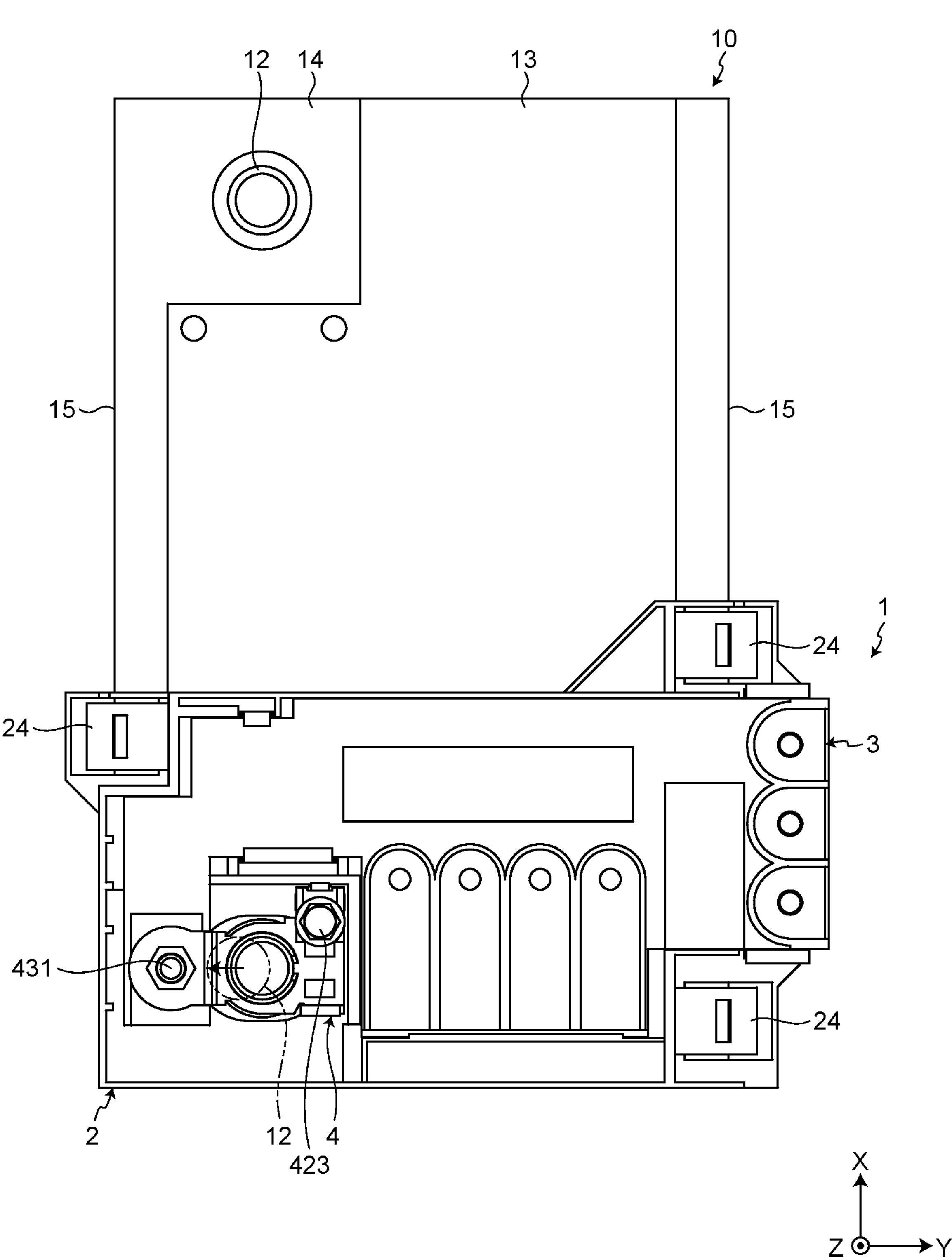
FIG. 7 is an explanatory view of assembly of the fusible link according to the embodiment.

As illustrated in FIG. 7, in the battery 10, the position of the battery post 12 may differ depending on the battery standard or the like, but the fusible link unit 1 can be reliably and easily attached corresponding to the position. That is, the fusible link unit 1 can be easily attached to the battery 10 in which the battery post 12 is installed at a different position by moving the lower cover 2 in the long side direction X with respect to the battery 10 to make the lower cover 2 attachable and moving the fusible link 3 in the short side direction Y with respect to the lower cover 2 to make the fusible link 3 attachable.

The fusible link unit 1 has a structure in which the fusible link 3 and the battery terminal 4 are directly connected to each other. Thus, it is not necessary to connect a member for corresponding to the position of the battery post 12 between the fusible link 3 and the battery terminal 4. Therefore, the number of components of the fusible link unit 1 can be reduced.

As described above, in the fusible link unit 1 according to the present embodiment, the lower cover 2 is made movable in the long side direction X with respect to the battery 10, and the fusible link 3 is made movable in the short side direction Y with respect to the lower cover 2. With this configuration, the lower cover 2 and the fusible link 3 can be moved in accordance with the position of the battery post 12 and easily assembled to the battery 10. In the fusible link unit 1 according to the present embodiment, the battery terminal 4 can be directly connected to the fusible link 3, and the fusible link unit 1 can be assembled to the battery 10 with a small number of components.

The fusible link unit 1 according to the present embodiment includes the latch 24 and the latch 25 in the lower cover 2. With this configuration, the lower cover 2 can be made movable in the long side direction X with respect to the battery 10, and the fusible link 3 can be made movable in the short side direction Y with respect to the lower cover 2.

In the fusible link unit 1 according to the present embodiment, the installation hole 21 of the lower cover 2 is formed to be larger than the insertion hole 411 of the battery terminal 4. With this configuration, the battery post 12 can be inserted through the lower cover 2 even when the lower cover 2 and the fusible link 3 are moved with respect to the battery 10. Therefore, the fusible link unit 1 according to the present embodiment can be appropriately assembled to the battery 10.

The fusible link unit 1 according to the present embodiment can be appropriately and easily assembled to the battery 10 (e.g., an EN-standard battery) in which the battery post 12 is provided at the position of the recess 14 recessed from the upper surface 13.

Note that the fusible link unit according to the present invention is not limited to the above-described embodiment, and various modifications can be made within the scope recited in the claims. The fusible link unit according to the present embodiment may be configured by appropriately combining the constituent elements of the embodiment and the modifications described above.

For example, in the fusible link unit 1 according to the above-described embodiment, the case in which the fusible link unit 1 is assembled to the battery 10 with the recess 14 formed therein has been described, but the fusible link unit 1 may be assembled to a battery with no recess 14 formed therein. Even such a fusible link unit can be easily assembled to the battery 10 similarly to the fusible link unit 1 according to the above-described embodiment and can be assembled to the battery 10 with a small number of components.

The fusible link unit according to the present embodiment can be easily connected to an electric device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A fusible link unit comprising:

a holding member being latched to a battery, the holding member being movable in a first direction intersecting an axial direction of a battery post, the holding member being attached to the battery;

a fusible link including a fusible portion that fuses when a current supplied from the battery is an overcurrent, the fusible link being latched to the holding member, the fusible link being movable in a second direction that is a direction intersecting the axial direction and the first direction, the fusible link being attached to the holding member; and a battery terminal being attached to the fusible link and connected to the battery post, wherein the holding member includes a first latch that latches the battery and allows the holding member to move in the first direction with respect to the battery, and a second latch that latches the fusible link and allows the fusible link to move in the second direction with respect to the holding member.

2. The fusible link unit according to claim 1, wherein the battery terminal includes a mounting portion in which an insertion hole through which the battery post is inserted is formed, and in the holding member, an installation hole is formed, the installation hole being a hole through which the battery post is inserted and being formed to be larger than the insertion hole.

3. The fusible link unit according to claim 1, being assembled to the battery in which the battery post is provided at a position of a recess recessed from an upper surface.

* * * * *